# 3,016,299
FUMARIC ACID COMPOSITION
Stanley P. Raffensperger, Palos Park, and Thomas T. Takashima, La Grange, Ill., assignors to General Foods Corporation, White Plains, N.Y., a corporation of Delaware
No Drawing. Filed Feb. 9, 1959, Ser. No. 791,862
12 Claims. (Cl. 99—78)

The following invention relates to an improved method of increasing the solubility rate of fumaric acid in water and, in particular, the solubility rate of fumaric acid in cold water.

In the past, citric acid has been employed as an acidulant in dehydrated beverage powders capable of being rehydrated in cold water. In addition to citric acid, such powders usually contain other hydroscopic materials such as sugars and the like. Such compositions are relatively unstable if stored for extended periods of time since they readily absorb moisture and cake upon standing. The storage problem encountered with such dehydrated beverage powders has always been of great concern to those skilled-in-the-art and in particular the storage problems encountered in warm, humid climates. Fumaric acid has many properties which make it desirable for commercial use in such products. However, such uses are limited due to the fact that fumaric acid has a very low rate of solubility in cold water. While the dry beverage powders of commerce are rehydratable in cold water in less than one minute, the use of fumaric acid in such powders in the past has been impossible due to the fact that the fumaric acid does not dissolve rapidly in cold water, periods as long as 24 hours at times not being sufficient to put all of the fumaric acid into solution.

It is an object of this invention to prepare a fumaric acid composition which has an increased rate of solubility in cold water. It is a further object of this invention to prepare a fumaric acid composition which when used in cold water soluble beverage powders will not absorb substantial amounts of moisture upon standing and will be readily and easily soluble in cold water. Further objects of this invention will be apparent from a reading of the specification.

It has now been discovered that the rate of solubility of fumaric acid may be increased by wetting crystalline of fumaric acid with a quantity of water insufficient to destroy the crystalline character of all of the sugar but sufficient to create a proportion of sugar solution capable of aggregating fumaric acid powder and undissolved sugar crystals; such a wetted sugar will generally have a moisture content in excess of 5% and for the more typical sugar, sucrose, a moisture content of at least 7%. The fumaric acid, on the other hand, is ground to a particle size whereat it will, upon addition to an aqueous liquid, neither float at the top of said liquid nor drop to the bottom of a body of said liquid, but rather will be suspended throughout, such that the fumaric acid powder can be combined by admixture with the wetted sugar and aggregate with the sugar crystals thereof. This aggregate is eventually dried under conditions of time and temperature insufficient to melt the sugar crystals but sufficient to reduce the moisture content of said aggregates to a stable level, say less than 1%, wherebelow the product will not lump later in storage. Finally, the dried product is broken up to a particle size suitable for handling.

In achieving such particle size reduction of the fumaric acid powder and combining this powder with the wetted sugar, the sugar and fumaric acid powder should be in sufficient proportion to one another to permit the sugar solution to coat the fumaric acid powder and the sugar crystals whereby the aforesaid aggregation occurs. Granulation of the fumaric acid powder may be practiced before combination thereof with the wetted sugar or the wetted sugar can be ground with the fumaric acid powder during which operation the aggregate is subdivided to the particle size desired. The most suitable particle size of the fumaric acid and sugar will not be the same for all methods of preparing the fumaric acid composition of the present invention. While the invention is not to be limited to any specific proportion of sugar to fumaric acid powder, it has generally been found that a 1:1 by weight ratio produces an acceptable proportion of ingredients although still higher proportions of sugar may be practiced, ranging upwards to the neighborhood of 4 to 5 parts by weight of sugar per part by weight of fumaric acid powder. The sugar crystals should, as indicated above, be wetted to the extent that a small portion of the sugar crystals are in solution. In any event, the sugar should be in a partially hydrous state, the degree of hydration depending upon the sugar involved. In the case of sucrose, a moisture level of at least 7% by weight of the sugar and fumaric acid combination should be employed. Some desired results are obtained at moisture levels of below 7%; but below moistures of 5% by weight the degree of wetting is insufficient to produce the desired aggregates.

While sugars such as the monosaccharides, disaccharides, polyaccharides or the sugar alcohols may be employed, it is preferred to employ disaccharides such as sucrose or monosaccharides such as dextrose. The sugars employed should be of such nature that when the fumaric acid composition of the present invention is dried, the sugar will not remain in a syrupy state and will be substantially dry and crystalline.

While it is preferred to use water as the moisture source, other solvents in which both the sugar and fumaric acid are soluble may be employed.

In producing the fumaric acid compositions according to certain embodiments of this invention, fumaric acid having a particle size of commercial 40 to 230 U.S. Standard mesh and preferably about commercial 100 U.S. Standard mesh is dry blended with a sugar having a particle size of commercial 18 to 100 U.S. Standard mesh and preferably commercial 30 U.S. Standard mesh. Where sucrose is employed, then 0.5 to 4.5 parts by weight of sucrose to one part by weight of fumaric acid may be employed and preferably one part by weight of sucrose to one part by weight of fumaric acid. The mixture is blended until a homogeneous mass is obtained. Blending for an excessive period of time causes the particles to segregate and therefore it has been found preferable to blend until uniformity is obtained. The dry mixture of fumaric acid and sugar is moistened by the addition of 5–10% moisture and preferably 7%. A moisture content of the moistened mixture of less than 5% produces a product which is not sufficiently wet to obtain the desired end product and a moisture content of more than about 10% where sucrose is employed permits the undesirable inversion of sucrose to take place when the wetted mixture is heated in the presence of fumaric acid, frequently resulting in an invert syrup which canot be dried. The moisture content of the mixture must be between those upper and lower limits at which the particles "pack" or adhere together as a friable mass of aggregates. The moistened mixture is blended to obtain a uniform distribution of the added water and to wet all the dry powder particles thereby permitting the wetted sugar to adhere to and coat the fumaric acid. The wetted mixture of fumaric acid and sugar is then dried to less than about 1% and preferably less than 0.5% so that aggregates of the particles are formed. A moisture content of over about 1% in the final product results in a product which cakes upon storage. Where sucrose is the saccharide employed, it has been found that where the particle size of the material being dried is relatively large, it is preferred to maintain the temperature of the mixture below 130° F. at all times to avoid inversion to sucrose. Therefore, drying should be carried out as rapidly as possible while avoiding temperatures which will cause inversion. The dried mixture is granulated by forcing it through a screen to obtain particles having a size of commercial 18 to 60 U.S. Standard mesh and preferably commercial 30 U.S. Standard mesh. The particle size will be determined to some extent by the particle size of the ingredients it is to be mixed with since it is preferred to have particles of the same size in order to avoid segregation.

In producting the fumaric acid compositions according to another embodiment of this invention, the mixture after being wetted as in the earlier described embodiment is granulated through a 10–40 U.S. Standard mesh screen and preferably through a 30 U.S. Standard mesh screen. The wet, granulated material is then dried. Since the particle size in this embodiment of the present invention has been reduced prior to drying, it is possible to employ temperatures in the order of 160° F. for short periods of time when employing sucrose since drying takes place much more rapidly than when large particles are employed without exceeding temperatures at which inversion of the sucrose takes place. Drying is carried out until the moisture content of the product is less than 1% and preferably less than 0.5%.

According to yet another embodiment of this invention sucrose and fumaric acid both having a mesh size of commercial 18 to 100 and preferably commercial 30 U.S. Standard mesh are dry blended to obtain a uniform mixture. The sucrose may be employed at a ratio of 0.5 to 4.5 parts by weight per part by weight of fumaric acid. While greater quantities may be employed, it has been found that for economic purposes it is preferred to employ no more than 4 parts by weight of sucrose per part by weight of fumaric acid. The blended mixture is then ground so that the particles pass through a 100 U.S. Standard screen. Where the grinding results in an excessive amount of fine material, the fine material may, if desired, be removed by any common means or separating one particle size from another such as air classification or similar means. The ground mixture is moistened by the addition of 5 to 10% and preferably 7% water and is mixed to obtain a uniform mixture so that all of the particles are wetted and the wetted partices of sucrose adhere to and coat the fumaric acid. The mixture is then dried to a moisture content of less than 1% and preferably less than 0.5% and then granulated to obtain particles having a size of commercial 18 to 60 U.S. Standard mesh and preferably a size of commercial 30 U.S. Standard mesh. Since large aggregates may form during the wet blending, it is preferred when drying the wet material to employ temperatures below 130° F. to avoid inversion of the sucrose.

In producing the fumaric acid composition according to yet another embodiment of the present invention, the wetted material of the preceding embodiment which has been uniformly wetted and mixed is granulated to a particle size of 10 to 40 and preferably 30 U.S. Standard mesh and then dried to a moisture content of less than 1% and preferably less than 0.5%.

As an alternative to the preceding embodiments, when it is desired to employ the composition of the present invention in admixture with other pulverulent materials, such materials may be added to the moistened mixture of any of the preceding embodiments before drying and the entire mass dried while being mixed and agitated. Where sucrose is the major constituent of the added pulverulent material, eminently desirable results are obtained if the moistened mass is dried with infra-red heat since the temperature of the sucrose can readily be maintained below 90° F. thus preventing the undesirable inversion of sucrose. The advantage of such a procedure is that it allows simultaneous agglomeration of the fumaric acid powder with the sugar ingredients of the composition as well as blending of such agglomerates with the remaining ingredients of such a composition.

While it is preferred in many embodiments of the present invention to dry blend the fumaric acid and sugar before the water is added, in many instances it may be desirable to blend the fumaric acid with a sugar solution.

The following examples illustrate various embodiments of the present invention but it is to be understood that these examples are for purposes of illustration only and that the invention is not limited thereto since various changes can be made by those skilled-in-the-art without departing from its scope and spirit.

Example I

Twenty-five pounds of fumaric acid having a particle size of 100 U.S. Standard mesh are mixed with 25 pounds of sucrose having a particle size of 100 U.S. Standard mesh. The dry ingredients are co-blended for ten minutes at low speed in a Sprout-Waldron ribbon mixer. Three and one-half pounds of water are added to the mixture and the mixing is continued for ten minutes at low speed in the Sprout-Waldron ribbon mixer. The mixture is then dried by introducing steam at 7–10 p.s.i.g. into the jacket of the Sprout-Waldron and mixing for 25 minutes at low speed and 15 minutes at high speed. The dried material is granulated to a 30 U.S. Standard mesh size in a Colten Screen Granulator.

Example II

Twenty-five pounds of fumaric acid having a particle size of 100 U.S. Standard mesh are mixed with 25 pounds of sucrose having a particle size of 100 U.S. Standard mesh. The dry ingredients are co-blended for ten minutes at low speed in a Sprout-Waldron ribbon mixer. Three and one-half pounds of water are added to the mixture and the mixing is continued for ten minutes at low speed in the Sprout-Waldron ribbon mixer. The wetted mixture is granulated to a 30 U.S. Standard mesh size by passing it through a Colten Screen Granulator. The wet, granulated material is then dried to a moisture content of 0.4% by drying in a Proctor and Schwartz tray drier while employing a bed thickness of 0.25 inch, a hot air temperature of 160° F. and an air velocity of about 250 to 550 c.f.m.

Example III

One hundred pounds of 30 U.S. Standard mesh fumaric acid and 200 pounds of 30 U.S. Standard mesh sucrose are dry blended in a Sprout-Waldron ribbon mixer. The dry material is then ground in a Fitzpatrick mill having a 100 U.S. Standard mesh screen. The ground mixture was wetted by adding 21 pounds of water to the mixture. The mixture was well blended to obtain a uniform distribution of the water and was then dried by introducing steam at a pressure of 7–10 p.s.i.g. into the jacket of the Sprout-Waldron ribbon mixer and agitating while heating. The mixture was dried to a moisture content of 0.5% and then granulated to a particle size of 30 U.S. Standard mesh in a Colten Screen Granulator.

Example IV

One hundred pounds of 30 U.S. Standard mesh fumaric acid and 200 pounds of 30 U.S. Standard mesh sucrose are dry blended in a Sprout-Waldron ribbon mixer. The dry material is then ground in a Fitzpatrick mill having a 100 U.S. Standard mesh screen. The ground mixture was wetted by adding 21 pounds of water to the mixture.

The mixture was well blended to obtain a uniform distribution of the water. The wetted mixture was then granulated to a 30 mesh particle size in a Colten Screen Granulator and then dried without agitation in a Proctor and Schwartz tray drier at a temperature of 160° F. The bed thickness was 0.25 inches, the hot air temperature was about 140 to 160° F. and the air velocity was about 250–550 c.f.m.

*Example V*

Twenty-five pounds of fumaric acid having a particle size of 100 U.S. Standard mesh are mixed with 25 pounds of dextrose having a particle size of 100 U.S. Standard mesh. The dry ingredients are co-blended for ten minutes at low speed in a Sprout-Waldron ribbon mixer. Three and one-half pounds of water are added to the mixture and the mixing is continued for ten minutes at low speed in the Sprout-Waldron ribbon mixer. The mixture is then dried by introducing steam at 7–10 p.s.i.g. into the jacket of the Sprout-Waldron and mixing for 25 minutes at low speed and 15 minutes at high speed. The dried material is granulated to a 30 U.S. Standard mesh size in a Colten Screen Granulator.

The fumaric acid composition of the present invention may be employed wherever it is desired to utilize fumaric acid in cold water where a relatively rapid rate of solubility is required. One such use is in fruit flavored beverage mixes which are dissolved in very cold water. Such mixes typically contain sugars, an edible acid, flavoring and coloring. A typical fruit flavored beverage mix composition as employed in this invention is:

| | Parts by weight |
|---|---|
| Fumaric acid | 20.00–90.00 |
| Fruit flavor (natural or imitation—fixed in gum arabic) | .25–1.75 |
| Color (FD & C—certified food coloring) | .10–1.25 |
| Dextrose hydrate or sucrose—sufficient to bring the total parts by weight to 100. | |

17.7 grams of the above mix may be dissolved in two quarts of cold water and to this solution may be added 1–1.5 cups of sugar to prepare a fruit flavored beverage. As an alternative, the sugar may be incorporated in the dry beverage mix rather than being added after the mix has been dissolved.

Fruit flavored beverage powders which contain the fumaric acid composition of the present invention in combination with a hydroscopic sugar such as sucrose or the like exhibit little or no caking after extended periods of storage, and after such time, can be rehydrated in cold water within several minutes. When the fumaric acid composition of the present invention is employed in fruit flavored beverage compositions which contain dextrose, flavoring, coloring and the fumaric acid composition as a substitute for citric acid, it is possible to reduce the total weight of acid from 4.5 g. per 17.7 g. of beverage powder in the case of citric acid to 2.7 g. per 17.7 g. while obtaining an equivalent product. Furthermore, where dextrose is employed as the filler in such beverage powders, it may be employed at lower levels when the fumaric acid composition of the present invention is used as a replacement for citric acid.

What is claimed is:

1. A method of preparing a fumaric acid containing composition having an increased rate of solubility which comprises admixing water, fumaric acid powder and a crystalline sugar in such proportions that the crystalline character of the sugar is not completely destroyed and the sugar is in solution to an extent sufficient to coat fumaric acid powder and sugar crystals, combining said moistened sugar with fumaric acid powder in proportions whereat said sugar and powder are aggregated by said sugar solution, said fumaric acid powder being of a size whereat it does not float at the top of and does not sink to the bottom of a body of aqueous fluid, drying the aggregates of said wetted sugar and said fumaric acid powder at a temperature below the melting point of the sugar and for a sufficient length of time to preserve the crystallinity thereof while producing a friable, substantially anhydrous product, and breaking up said dried product into granules.

2. The method according to claim 1 wherein the parts by weight of sucrose used are 0.5–4.5 parts by weight per part by weight of fumaric acid.

3. The method according to claim 2 wherein the weight of water used is from 5–10% by weight of the sucrose and fumaric acid.

4. A method of preparing a fumaric acid containing composition having an increased rate of solubility which comprises admixing water, fumaric acid powder and sucrose in such proportions that the crystalline character of the sucrose is not completely destroyed and the sucrose is in solution to an extent sufficient to coat fumaric acid powder and sucrose crystals, said sucrose being present at a level of 0.5 to 4.5 parts by weight per part by weight of fumaric acid, said water being present at a level of 5 to 10 percent of said mixture of sucrose and fumaric acid, combining said moistened sucrose with fumaric acid powder and drying said moistened mixture at a temperature of less than about 160° F. so that the sucrose is in a substantially dry and crystalline state.

5. The method according to claim 4 wherein the moistened mixture is granulated through a 10 to 40 U.S. Standard mesh screen prior to drying.

6. The method according to claim 4 wherein the temperature of drying is less than about 130° F. and the mixture is granulated through an 18 to 60 U.S. Standard mesh screen after drying.

7. The method according to claim 5 wherein the sugar has a particle size of commercial 18–100 U.S. Standard mesh and the fumaric acid a particle size of commercial 40–230 U.S. Standard mesh before the moisture is added.

8. The method of preparing a fumaric acid containing composition having an increased rate of solubility which comprises admixing water, fumaric acid powder and sucrose in such proportions that the crystalline character of the sucrose is not completely destroyed and the sucrose is in solution to an extent sufficient to coat fumaric acid powder and sucrose crystals, said sucrose being present at a level of 0.5 to 4.5 parts by weight per part by weight of fumaric acid, said sucrose and fumaric acid having a particle size of commercial 70–125 U.S. Standard mesh, said water being present at a level of 5 to 10 percent by weight of said fumaric acid and sucrose, combining said moistened sucrose with fumaric acid powder, drying said moistened mixture at a temperature of less than about 160° F. so that the sucrose is in a substantially dry and crystalline state and said fumaric acid composition has a moisture content of less than 1 percent.

9. The method according to claim 8 wherein the moistened mixture is granulated through a 10 to 40 U.S. Standard mesh screen prior to drying.

10. The method according to claim 8 wherein the temperature of drying is less than about 130° F. and the mixture is granulated through an 18 to 60 U.S. Standard mesh screen after drying.

11. The method according to claim 8 wherein the mixed sucrose and fumaric acid powder are ground through a 100 U.S. Standard mesh screen before the moisture is added.

12. A method of preparing a fumaric acid containing composition having an increased rate of solubility which comprises admixing water, fumaric acid powder and a crystalline sugar in such proportions that the crystalline character of the sugar is not completely destroyed and the sugar is in solution to an extent sufficient to coat fumaric acid powder and sugar crystals, combining said moistened sugar with fumaric acid powder in proportions whereat said sugar and powder are aggregated by said sugar solution, said fumaric acid powder being of a size whereat it does not float at the top of and does not sink to the bottom of a body of aqueous fluid, and drying the aggregates of said wetted sugar and said fumaric acid powder at a temperature below the melting point of the sugar and for a sufficient length of time to preserve the crystallinity thereof while producing a friable, substantially anhydrous product.

References Cited in the file of this patent

UNITED STATES PATENTS

| | | |
|---|---|---|
| 2,463,962 | Gorcica et al. | Mar. 8, 1949 |
| 2,511,804 | Hall | June 13, 1950 |
| 2,694,641 | Atwood et al. | Nov. 16, 1954 |
| 2,781,268 | Abbott et al. | Feb. 12, 1957 |
| 2,868,646 | Schapiro | Jan. 13, 1959 |